United States Patent
Beck et al.

(10) Patent No.: US 6,540,097 B1
(45) Date of Patent: Apr. 1, 2003

(54) COOKING VESSEL

(75) Inventors: Hans-Jürgen Beck, Littau (CH); Arnold Thelen, Kempfeld (DE); Uwe Dietrich, Niederhosenbach (DE)

(73) Assignee: AMC International Alfa Metalcraft Corporation AG, Rotkreuz (CH)

( * ) Notice: Subject to any disclaimer, the term of this patent is extended or adjusted under 35 U.S.C. 154(b) by 0 days.

(21) Appl. No.: 09/529,881

(22) PCT Filed: Oct. 2, 1998

(86) PCT No.: PCT/EP98/06293

§ 371 (c)(1), (2), (4) Date: Apr. 21, 2000

(87) PCT Pub. No.: WO99/20164

PCT Pub. Date: Apr. 29, 1999

(30) Foreign Application Priority Data

Oct. 22, 1997 (DE) .......................................... 197 46 509

(51) Int. Cl.⁷ .............................................. B65D 45/34
(52) U.S. Cl. ....................................... 220/321; 220/912
(58) Field of Search .............................. 220/320, 573.1, 220/202, 203.04, 203.29, 315, 319, 321, 912, 573.2–573.5; 215/274, 275, 276

(56) References Cited

U.S. PATENT DOCUMENTS

| | | | | |
|---|---|---|---|---|
| 1,681,150 A | * | 8/1928 | Vischer et al. ............... 220/240 |
| 1,784,516 A | | 12/1930 | Fairbanks | |
| 1,901,699 A | | 3/1933 | Burpee | |
| 2,191,975 A | * | 2/1940 | Stephens .................... 220/321 |
| 2,801,764 A | * | 8/1957 | Russel et al. ................ 220/320 |
| 3,193,129 A | * | 7/1965 | Pfluger et al. ............. 220/4.16 |
| 4,219,125 A | * | 8/1980 | Wiltshire et al. ........... 220/320 |
| 4,294,377 A | | 10/1981 | Chen | |
| 4,470,515 A | * | 9/1984 | Boehm ........................ 220/315 |
| 4,828,300 A | * | 5/1989 | Agbay ......................... 220/319 |
| 5,284,270 A | * | 2/1994 | Kusta ........................... 220/321 |
| 5,361,928 A | * | 11/1994 | Stolzman .................... 220/378 |
| 5,823,340 A | * | 10/1998 | Maihofer .................... 220/320 |
| 5,906,289 A | | 5/1999 | Aliesch et al. | |

FOREIGN PATENT DOCUMENTS

| | | |
|---|---|---|
| FR | 570 845 | 9/1923 |
| WO | WO 91 18543 | 12/1991 |
| WO | WO 96 35621 | 11/1996 |

* cited by examiner

*Primary Examiner*—Nathan J. Newhouse
(74) *Attorney, Agent, or Firm*—Wenderoth, Lind & Ponack, L.L.P.

(57) ABSTRACT

A cooking vessel has a container having an encircling container margin bent outwardly and with a cover having an encircling cover margin bent outwardly. The container can be closed airtight by the cover with the aid of a closing mechanism acting on the container margin and cover margin. The closing mechanism comprises a closure ring extending over the container circumference with a C-profile cross section open radially inwardly, which, with the aid of an actuating mechanism, can be moved from an open position with greater diameter, in which the cover can be lifted from the container, into a closed position with lesser diameter, in which the container margin and the cover margin are clamped together by interspacing a sealing ring between a lower flank and an upper flank of the closure ring. To improve the safety and the operating ease, either the encircling flanks of the closure ring are provided with radial slots open toward the inner flank margin and distributed over the circumference and/or the flanks are formed by C-profile segments, short in the circumferential direction, and disposed on an encircling annular connection element radially at the outside while keeping vacant interspaces distributed over the circumference.

27 Claims, 5 Drawing Sheets

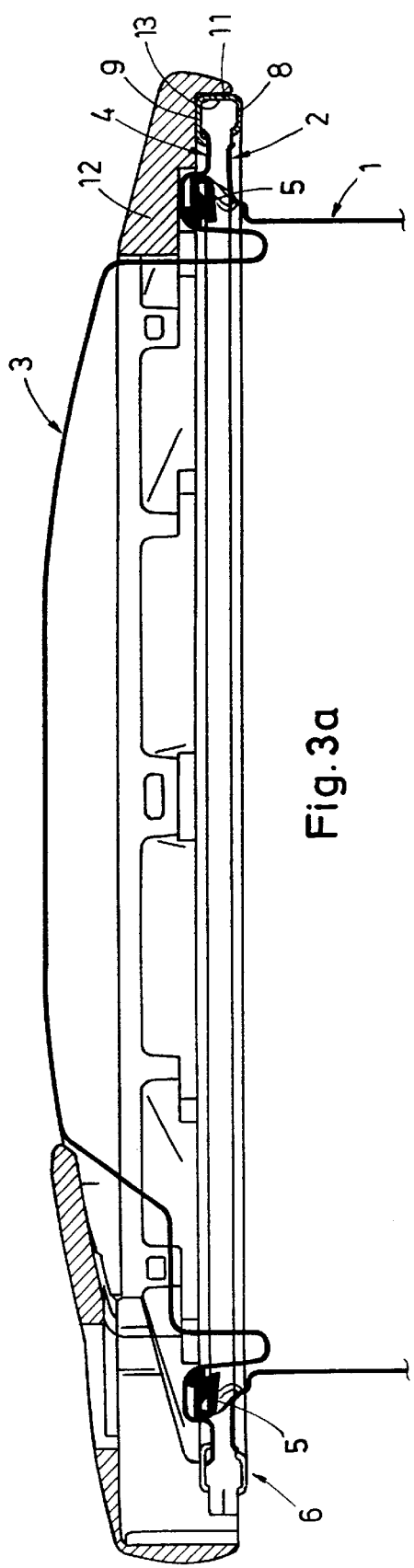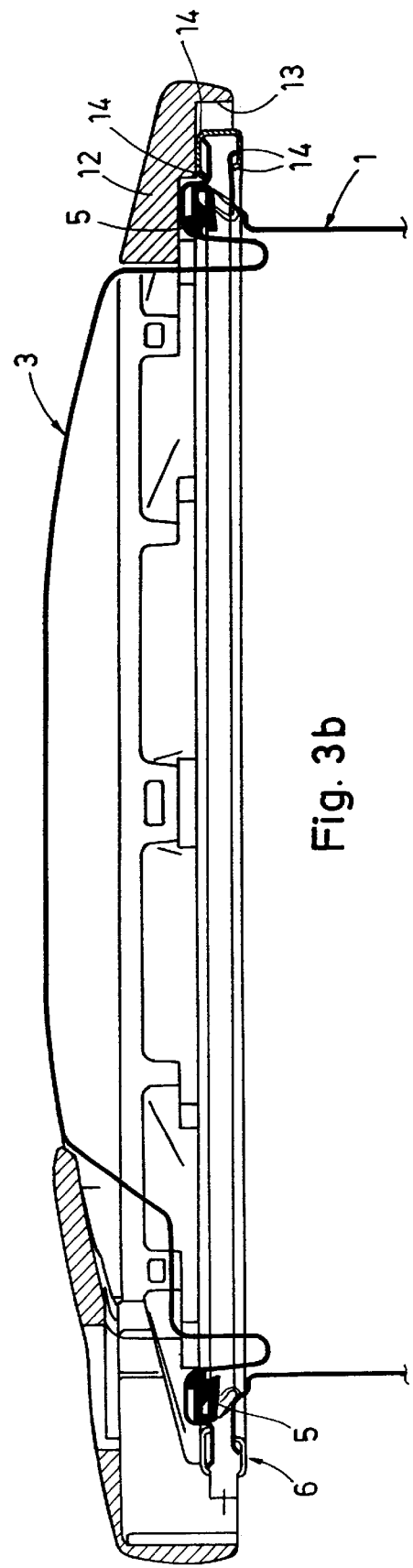

COOKING VESSEL

BACKGROUND OF THE INVENTION (1). Field of the Invention

The invention relates to a cooking vessel with a container intended to receive items to be cooked, comprising an outwardly bent, encircling container margin and with a cover placeable onto the container and comprising an outwardly bent, encircling cover margin, in which the container can be closed airtight by the emplaced cover with the aid of a closing mechanism acting on the container margin and the cover margin. The closing mechanism comprises a closure ring with a C-profile cross section open radially inwardly and having inherent rigidity, extending nearly over the entire container circumference and essentially nondeformable in terms of its height, but elastically deformable in the radial opening direction. With the aid of an actuating mechanism disposed on the cover, it can be moved from an open position with greater diameter, in which the container margin is released from a lower flank of the closure ring such that the cover can be removed from the container, into a closed position with lesser diameter, in which the container margin and the cover margin are clamped together by interspacing a sealing ring between the lower, shorter, flank and an upper, longer, flank of the closure ring.

(2). State of the Prior Art

Such a cooking vessel is disclosed for example in WO-A-96 35621. Herein a cover is provided for a container with an outwardly bent, encircling container margin. The container comprises a closing mechanism acting peripherally on the margin of the container. For this purpose, at the margin of the cover, an open closure ring of metal with elastic properties is accommodated, having spring resiliency, which, upon expansion of the closure ring, increases in diameter. In its resting position the closure ring is clamped between the end region of a portion of the encircling container margin and the end region of a bent-off portion structured annularly at the cover margin. The closing mechanism comprises means to expand the diameter of the closure ring against this spring resiliency. The closure ring is a C-profile with completely continuous wall between its two ends at which the closure mechanism applies. Of disadvantage herein is that the closure ring in the closed position does not assume a completely round form, which, however, should be striven for for reasons of greatest possible safety. Of disadvantage is further that the known closure ring must comprise, on the one hand, relatively strong material in order for it to absorb pressure forces under the given operating conditions of a pressure cooker and be substantially nondeformable in terms of height, but, on the other hand, is to have the requisite elasticity and ready adjustability in the radial direction. These requirements can only with difficulty be mutually fulfilled.

SUMMARY OF THE INVENTION

It is the objective of the present invention to remedy in particular these disadvantages of the prior art, and to propose a cooking vessel of the above described type which comprises greater safety and greater operating ease without increased technical expenditures.

This objective is achieved according to a main idea of the invention, for example, by either the encircling flanks of the closure ring being provided with radial slots of given length and width open toward the inner flank margin and distributed over the circumference or the flanks being formed by C-profile segments, short in the circumferential direction, and disposed on an encircling annular connection element radially at the outside while keeping vacant interspaces distributed over the circumference.

Several advantages are thereby achieved simultaneously: due to the selection of the slots or interspaces according to length and width, the opening forces, taking into consideration optimum operability, can be adjusted without the nondeformability of the closure ring suffering in terms of height. Therefore, for the closure ring or the individual C-profile segments, a relatively large material thickness can be used in order to increase the safety of the closure. The ready operability is not impaired thereby. With the number of slots or interspaces, the approximation of the closure ring to the circular form increases, which also contributes to increased safety.

If the flanks of the closure ring are of different length, i.e., if the lower flank is shorter than the upper one, such that during a move of the closure ring toward the outside into the open position the container margin is already released by the lower flank while the upper flank is still being carried on the cover margin, by way of the difference of slot length, an equalization of the radial deformability in the upper and lower flank region can be created, whereby the slots in both flanks terminate in each instance at the same spacing in front of the C-profile back.

A further improvement of the functional safety can be attained by the closure ring being guided on a covering ring, for example detachably held with spring elements on the cover, and comprising for example a synthetic material, perpendicularly to the cover axis.

In a further embodiment of the invention the closure ring rests in its open position on an outer circumferential shoulder formed, for example, by the covering ring, and extending parallel to the cover circumference, such that it is centered on the outer circumference. This has the advantage that the inner margin edge of the lower flank of the closure ring in the open position of the closure ring only needs to have a small spacing from the corresponding margin edge of the container margin in order to ensure that the cover can be readily placed and removed.

It is further of advantage according to a further characteristic of the invention if the margin edges of container margin and cover margin, on the one hand, and the two flanks of the closure ring, on the other hand, have bent-offs facing one another, whereby not only a stiffening of the particular margins and flanks is ensured but also the reliable guidance of these elements to one another.

According to a still further embodiment of the invention the closure ring is prestressed such that in its open position it tends to decrease its diameter, to thus move automatically into the closed position unless it is intentionally prevented from doing so. This contributes to a further increase of safety.

A simple operation of the cooking vessel structured according to the invention is attained in particular if the two ends of the closure ring for the force introduction are connected with the actuating mechanism, preferably form-fittingly.

In the actuating mechanism can take place a force transmission and possible force conversion from a movement of an actuating element into a movement of the ends of the closure ring in the circumferential direction.

In order to prevent the closure ring from automatically moving from an open position into the closed position or conversely, the actuating mechanism and thus also the position of the ends of the closure ring and/or the closure ring itself can be arrestable in the open position and/or the closed position.

For reasons of safety, further, the actuating mechanism can be coupled with a neutral-pressure safety mechanism and specifically such that the actuation for widening out of the closure ring from the closed position in the direction toward opening can only be initiated if the container interior is pressure-relieved.

The actuating mechanism is usefully developed such that during its actuation for opening, first steam is released until the interior of the vessel is without pressure. Thereby a potentially provided neutral-pressure safety mechanism enables a further actuation path, the ends of the closure ring are unlatched from a locking member and the actuation element is enabled for opening the closure latch such that the ends of the closure ring can be moved apart in the circumferential direction.

The actuating mechanism can comprise a slider as the actuating element, with the aid of which the neutral-pressure safety mechanism, a rotary button for opening the closure ring as a further actuating element, and thus the ends of the closure ring, can be latched.

Further goals, characteristics, advantages and application feasibilities of the invention are evident in the following description of embodiment examples in conjunction with the drawing. All described and/or graphically depicted characteristics alone or in any combination form the subject matter of the invention, independently of their compilation in individual claims or their reference back.

DETAILED DESCRIPTION OF THE PREFERRED EMBODIMENTS

Figure 1:
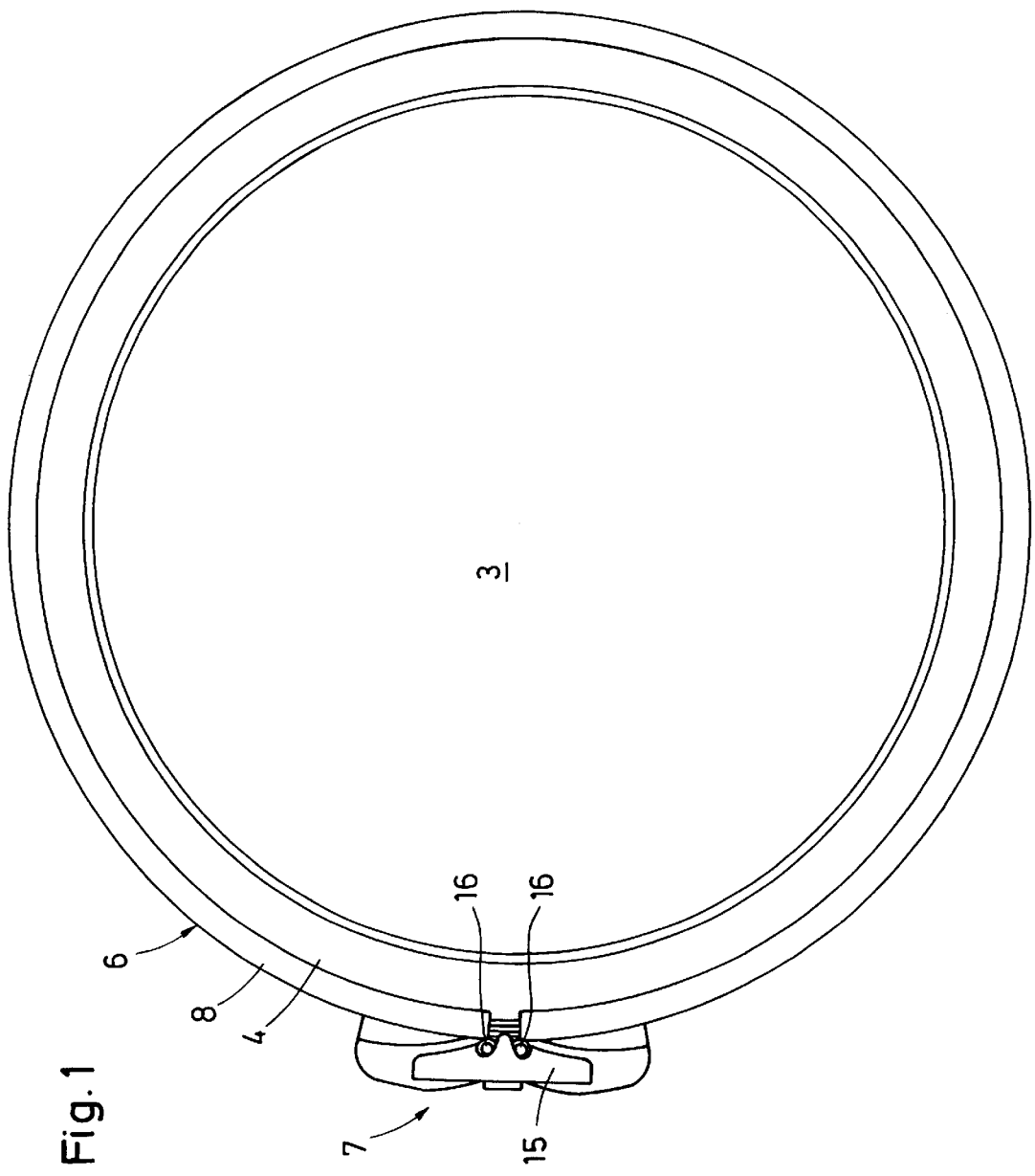
FIG. 1 a cover for a cooking vessel comprising the invention, seen from below.

A cooking vessel depicted in the Figures comprises a container 1 for receiving items to be cooked and a cover 3 with which the container 1 can be closed pressure-tight. The container 1 has an outwardly bent, smoothly encircling container margin 2. The cover 3 has an outwardly bent, smoothly encircling cover margin 4. Container margin 2 and cover margin 4 are each provided on the outside at their margin edges encircling with—as shown graphically—bent-offs 14 directed upwardly or downwardly.

The closing mechanism for the cooking vessel comprises an inherently rigid closure ring 6, extending essentially over the entire container circumference, essentially nondeformable in terms of height, however elastically deformable in the radial direction of opening, with a C-profile cross section open radially inwardly. With the aid of an actuating mechanism 7 disposed on the cover 3, the closure ring 6 call be moved from an open position with a greater diameter into a closed position with a lesser diameter. In the open position of closure ring 6 the container margin 2 is released from a lower flank 8 of the closure ring 6 such that the cover 3 can be removed upwardly from the container 1. In the closed position of the closure ring 6, in which the latter assumes a lesser diameter than in the open position, the container margin 2 and the cover margin 3 are clamped together by interspacing a sealing ring 5 between the lower, shorter flank 8 and the upper, longer flank 9 of the closure ring 6 structured as a C-profile.

It is evident in FIGS. 4a to 5b that the closure ring 6 comprises, in it two flanks 8, 9, slots 10 of selectable length and width distributed uniformly over the circumference or the closure ring 6. Alternatively, the closure ring 6 can be formed by an annularly encircling connection element 11', comprising for example wire, on which are disposed, for example, spot-welded C-profile segments of short length distributed uniformly over the circumference with interspaces 10'.

Figure 4A:
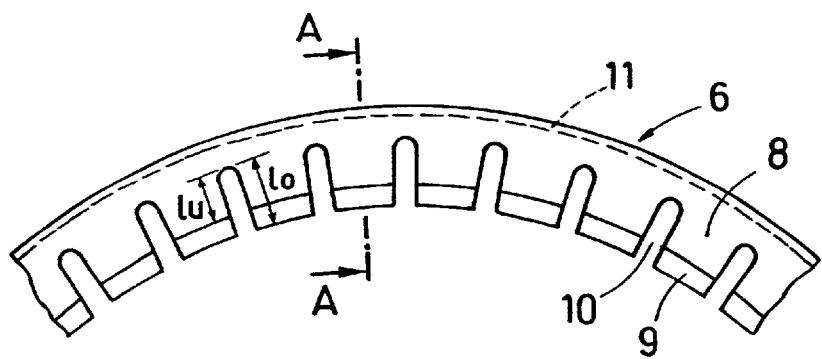
Figure 5A:
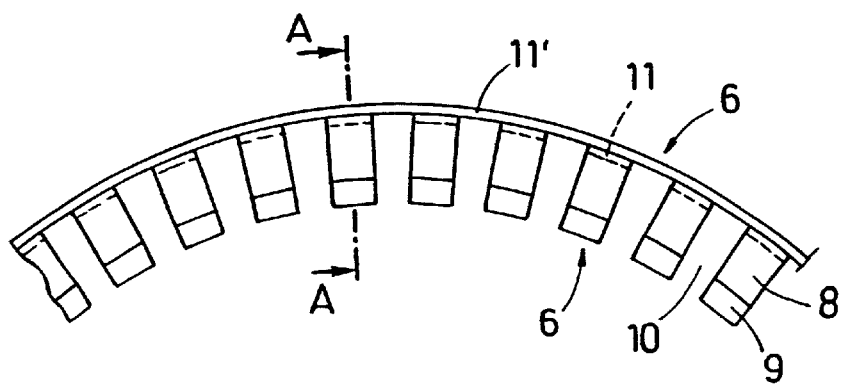
Figure 4B:
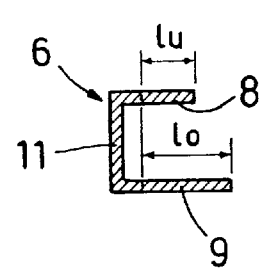
Figure 5B:
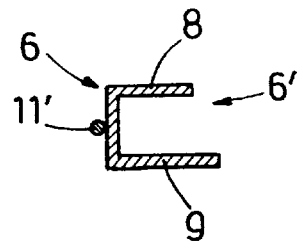

As is evident in FIG. 4a, the slots 10 in the shorter, lower flank 8 and the longer, upper flank 9 are of different length. However, to equalize the different flank length each terminates at the same spacing from the common C-profile back 11.

Figure 2:
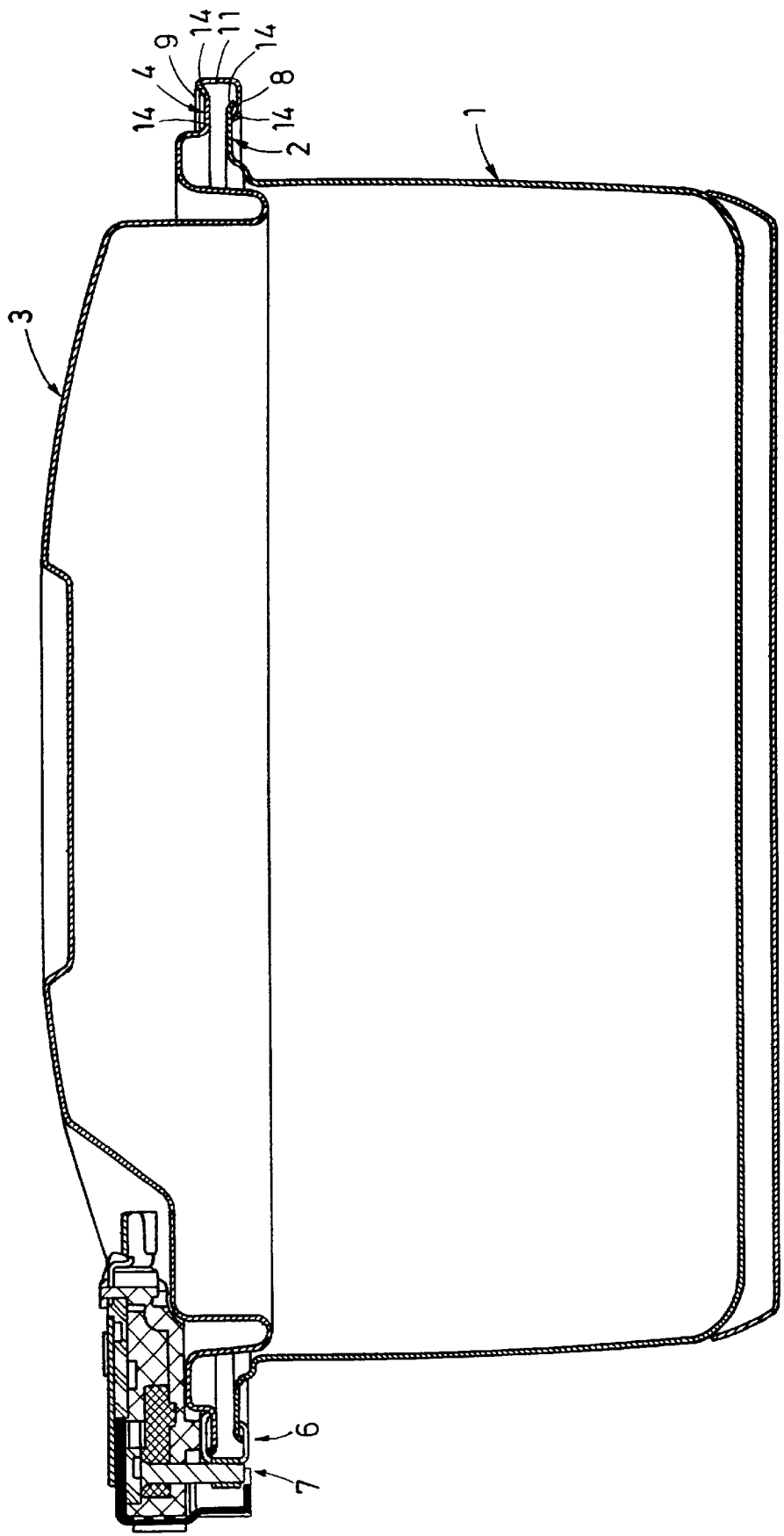
FIG. 2 a vertical section through a cooking vessel comprising the invention according to section line A—A of FIG. 1, according; to one embodiment, FIGS. 3a and 3b a vertical section corresponding to FIG. 2 through a cover according to the invention of a different developing, wherein in FIG. 3a the closure ring is in the open position, however, in FIG. 3b in the closed position, FIGS. 4a and 5a view onto partial segments of closure rings of different embodiment, FIGS. 4b and 5b sections through the closure rings of FIGS. 4a and 5a corresponding to the section lines A—A depicted therein, FIG. 6 a partially broken view from obliquely below onto a cover comprising the invention with the actuation mechanism, and FIGS. 7 and 8 two further representations of a cooking vessel according to the invention in the region of the actuating mechanism for the closure ring.

As is evident in FIGS. 2 to 3b, the inside margin edges of flanks 8, 9 of the closure ring 6 are provided with bent-offs 14 directed obliquely inwardly in order to attain, with container margin 2 and cover margin 4, additional stiffening and guidance of these elements together.

Figure 6:
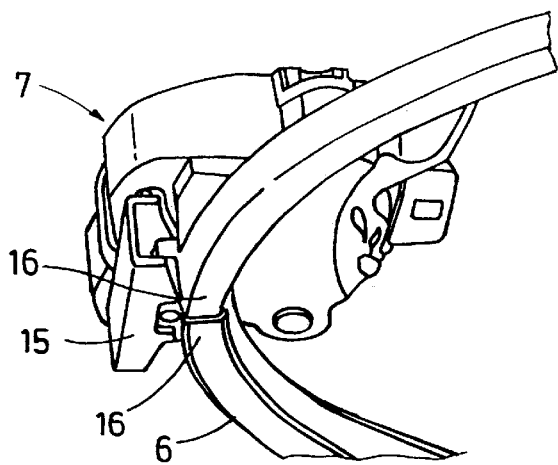
Figure 7:
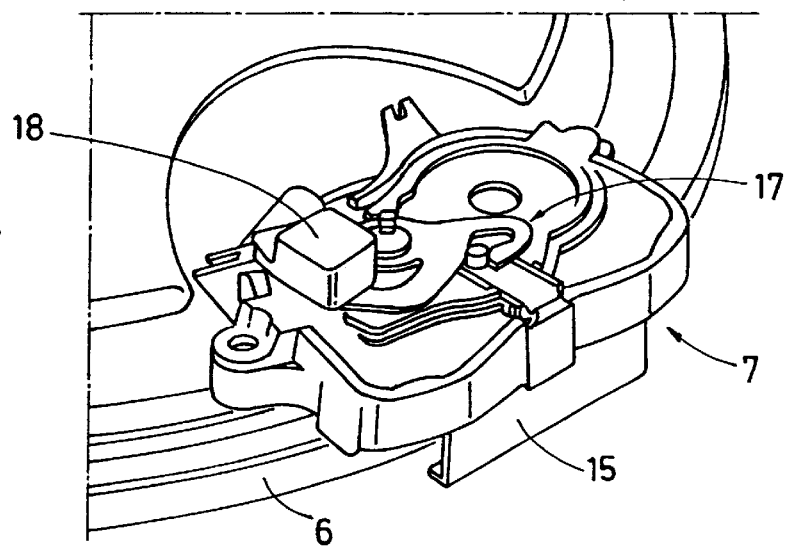
Figure 8:
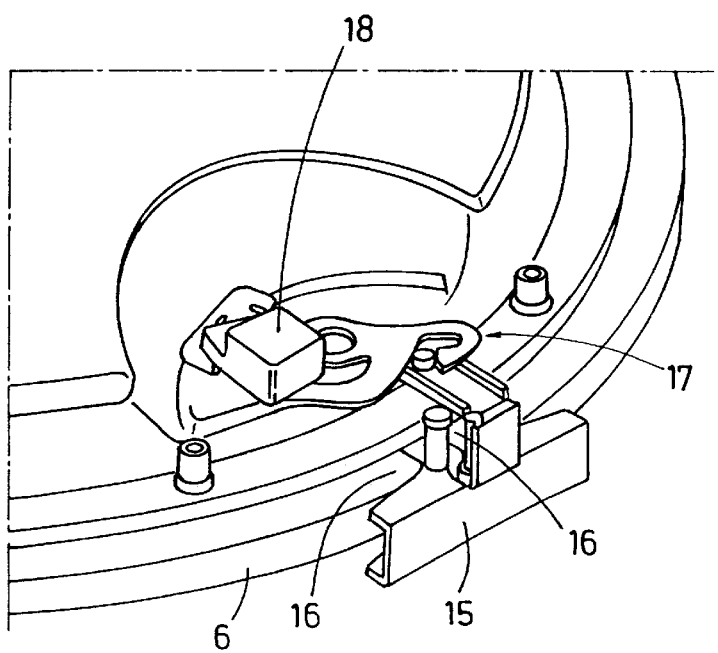

On the basis of the embodiment depicted in FIGS. 3a and 3b, it is evident that the closure ring 6, during its opening and closing movements, is guided on a covering ring 12 of synthetic material perpendicularly to the axis of rotation, which covering ring can be detachably disposed with the aid of (not shown) spring elements on the metal body of cover 3. This covering ring 12 is also suitable for an purpose of receiving an actuating mechanism 7 (see e.g. FIGS. 6 to 8) for the closure ring 6. The covering ring 12 forms further a circumferential shoulder 13 on which the closure ring 6 in its open position, shown in FIG. 3a, rests with its C-profile back 11 and is thereby retained centered.

As is evident from FIGS. 1 and 6 to 8 the actuating mechanism 7 has a radially adjustable locking member 15 which encompasses, in the closed position, end segments 16 of the closure ring 6 and latches them. The actuating mechanism 7 further comprises a lever gear 17 which converts a movement of a further actuating element (not shown), structured for example as a rotary button, into a movement of the ends of the closure ring 6 in the circumferential direction.

The opening process proceeds essentially as follows: by actuating a slider 18 of the actuating mechanism 7, the interior of the vessel is initially brought to neutral pressure by releasing steam. This neutral-pressure safety mechanism subsequently enables a further actuation path of slider 18. The locking member 15 can thereby be moved into its open position. Simultaneously a rotary button is released such that the closure ring 6 can be opened. Rotation of the rotary button moves the ends of the closure ring 6 away from one another in the circumferential direction such that the closure ring 6 becomes widened in its diameter until it is centered and rests on the circumferential shoulder 13 of the covering ring 12. In the open position the rotary button can snap in such that the closure ring 6, against its tendency due to its prestress to become narrowed, is held in its circular centered open position. In this position the cover 3 can be removed simply from the container 1 in the upward direction since the container margin 2 is released from the lower flank 8 of the closure ring 6.

For closure the rotary button is turned in the reverse direction, whereby the closure ring 6, by bringing together its ends, is brought into the closed position, in which container margin 2 and cover margin 4, by interspacing the sealing ring 5, are clamped in by flanks 8, 9 of the closure ring 6. This process is enhanced by the prestress of the closure ring 6, whereby high operating ease is ensured. The latching subsequently takes place in the above described manner by means of the slider 18.

What is claimed is:

1. A cooking utensil, comprising:
    a container for holding goods to be cooked, said container having an outwardly bent peripheral container rim;
    a lid which can be placed on said container, said lid having an outwardly bent peripheral lid rim; and
    a closing mechanism which can pressure-tightly close said container with said lid by acting on said container rim and said lid rim, said closing mechanism comprising
        a rigid closing ring extending over almost the entire periphery of said container, said closing ring being essentially non-deformable in height and elastically deformable in a radial opening direction, having a C-profile cross section that is radially inwardly open, has a lower arm, has an upper arm that is longer than said lower arm, and has a back,
        a sealing ring intermediate said container rim and said lid rim,
        an activation mechanism arranged on said lid which can bring said closing ring from an open position of greater diameter to a closed position of smaller diameter in which said container rim and said lid rim are clamped together between said lower arm and said upper arm;
    wherein said closing ring has radial slots in said lower arm and said upper arm of a given length and width open towards an inner side of said lower arm and said upper arm, said radial slots ending at a point spaced from said back of said C-profile cross section.

2. The cooking utensil of claim 1, wherein said radial slots in said lower arm and said upper arm are of different lengths but end at the same distance from said back of said C-profile cross section.

3. The cooking utensil of claim 1, and further comprising a cover ring releasably held on said lid that radially guides said closing ring.

4. The cooking utensil of claim 3, wherein said cover ring is releasably held on said lid by spring elements.

5. The cooking utensil of claim 1, wherein said closing ring, in said open position, lies on an outer peripheral shoulder that runs parallel to the periphery of said lid.

6. The cooking utensil of claim 5, and further comprising a cover ring forming said shoulder.

7. The cooking utensil of claim 1, wherein said container rim and said lid rim, on one side, and said lower arm and said upper arm, on another side, have respective chamfers facing each other.

8. The cooking utensil of claim 1, wherein said closing ring is pretensioned such that in said open position, said closing ring has a tendency to reduce its diameter.

9. The cooking utensil of claim 1, wherein said closing ring has two ends that are connected to said activation mechanism for action on said closing ring by said activation mechanism.

10. The cooking utensil of claim 1, wherein said activation mechanism comprises an activation element and said activation mechanism is connected to ends of said closing ring such that movement of said activation element is transferred into peripheral movement of said ends of said closing ring.

11. The cooking utensil of claim 1, wherein said activation mechanism and/or said closing ring can be locked in said open position and/or said closed position.

12. The cooking utensil of claim 1, wherein a zero pressure security device is coupled to said activation mechanism.

13. The cooking utensil of claim 10, wherein upon operation of said activation mechanism to bring said closing ring to said open position, steam is first released steam until said container is depressurized, and as a result, a zero pressure security device further releases an activation path, said ends of said closing ring are unlocked from a blocking element and said activation element is released to open said closing ring so that said ends of said closing ring can be moved apart in a peripheral direction.

14. The cooking utensil of claim 1, wherein said activation mechanism comprises a slider as an activation element by which a zero pressure security device, comprising a rotary knob for opening said closing ring, can be locked.

15. A cooking utensil, comprising:
    a container for holding goods to be cooked, said container having an outwardly bent peripheral container rim,
    a lid which can be placed on said container, said lid having an outwardly bent peripheral lid rim; and
    a closing mechanism which can pressure-tightly close said container with said lid by acting on said container rim and said lid rim, said closing mechanism comprising
        a closing ring extending over almost the entire periphery of said container, said closing ring being essentially non-deformable in height and elastically deformable in a radial opening direction, having a C-profile cross section that is radially inwardly open, has a lower arm, has an upper arm that is longer than said lower arm, and has a back,
        a sealing ring intermediate said container rim and said lid rim,
        an activation mechanism arranged on said lid which can bring said closing ring from an open position of greater diameter to a closed position of smaller diameter in which said container rim and said lid rim are clamped together between said lower arm and said upper arm;
    wherein said upper and lower arms of said closing ring are formed by a plurality of C-profile sections of short length and non-deformable in height arranged on an outer radially elastically deformable annular peripheral jointing element with radial spaces therebetween distributed uniformly over the periphery of said container.

16. The cooking utensil of claim 15, and further comprising a cover ring releasably held on said lid that radially guides said closing ring.

17. The cooking utensil of claim 16, wherein said cover ring is releasably held on said lid by spring elements.

18. The cooking utensil of claim 15, wherein said closing ring, in said open position, lies on an outer peripheral shoulder that runs parallel to the periphery of said lid.

19. The cooking utensil of claim 18, and further comprising a cover ring forming said shoulder.

20. The cooking utensil of claim 15, wherein said container rim and said lid rim, on one side, and said lower arm and said upper arm, on another side, have respective chamfers facing each other.

21. The cooking utensil of claim 15, wherein said closing ring is pretensioned such that in said open position, said closing ring has a tendency to reduce its diameter.

22. The cooking utensil of claim 15, wherein said closing ring has two ends that are connected to said activation mechanism for action on said closing ring by said activation mechanism.

23. The cooking utensil of claim 15, wherein said activation mechanism comprises an activation element and said activation mechanism is connected to ends of said closing ring such that movement of said activation element is transferred into peripheral movement of said ends of said closing ring.

24. The cooking utensil of claim 15, wherein said activation mechanism and/or said closing ring can be locked in said open position and/or said closed position.

25. The cooking utensil of claim 15, wherein a zero pressure security device is coupled to said activation mechanism.

26. The cooking utensil of claim 23, wherein upon operation of said activation mechanism to bring said closing ring to said open position, steam is first released steam until said container is depressurized, and as a result, a zero pressure security device further releases an activation path, said ends of said closing ring are unlocked from a blocking element and said activation element is released to open said closing ring so that said ends of said closing ring can be moved apart in a peripheral direction.

27. The cooking utensil of claim 15, wherein said activation mechanism comprises a slider as an activation element by which a zero pressure security device, comprising a rotary knob for opening said closing ring, can be locked.

* * * * *